(12) United States Patent
Kroon (10) Patent No.: US 12,375,633 B2
(45) Date of Patent: Jul. 29, 2025

(54) LOW COMPLEXITY MULTILAYER IMAGES WITH DEPTH

(71) Applicant: KONINKLIJKE PHILIPS N.V., Eindhoven (NL)

(72) Inventor: Bart Kroon, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 86 days.

(21) Appl. No.: 18/288,394

(22) PCT Filed: Apr. 25, 2022

(86) PCT No.: PCT/EP2022/060859
§ 371 (c)(1),
(2) Date: Oct. 26, 2023

(87) PCT Pub. No.: WO2022/229077
PCT Pub. Date: Nov. 3, 2022

(65) Prior Publication Data
US 2024/0214534 A1    Jun. 27, 2024

(30) Foreign Application Priority Data

Apr. 28, 2021 (EP) ................................... 21170826

(51) Int. Cl.
*H04N 13/111* (2018.01)
*H04N 19/597* (2014.01)
(52) U.S. Cl.
CPC ......... *H04N 13/111* (2018.05); *H04N 19/597* (2014.11)

(58) Field of Classification Search
CPC .. H04N 13/111; H04N 19/597; H04N 13/128; H04N 13/161; H04N 13/395
(Continued)

(56) References Cited

U.S. PATENT DOCUMENTS 8,106,924 B2 * 1/2012 Aliprandi ............. H04N 13/111
345/629
2009/0184960 A1 * 7/2009 Carr ....................... G06T 15/503
345/422

(Continued)

OTHER PUBLICATIONS

International Search Report and Written Opinion from WO2022/229077 mailed Nov. 15, 2022.
(Continued)

*Primary Examiner* — Tung T Vo (57) ABSTRACT

The invention provides a method for generating multilayer images. The method comprises receiving three-dimensional, 3D, source data of a scene and generating a plurality of layers at different depths in a virtual 3D scene, wherein each layer corresponds to a particular layer depth value relative to an origin point. Image data is generated for each layer based on the 3D source data, wherein the image data comprises texture data and transparency data, and displacement maps are generated for the layers based on the 3D source data and the depth values of the layers. The displacement maps define the depth of different points on a corresponding layer relative to the layer depth, wherein the generation of the displacement maps is restricted such that a depth surface, as defined by any displacement map, does not intersect any other depth surface in the virtual 3D scene. A depth surface is defined as the mapping of a displacement map onto the corresponding layer.

18 Claims, 3 Drawing Sheets

(58) Field of Classification Search
USPC .................................................. 375/240.21
See application file for complete search history.

(56) References Cited

U.S. PATENT DOCUMENTS

| | | | |
|---|---|---|---|
| 2012/0320965 A1 | 12/2012 | Kim et al. | |
| 2013/0321576 A1 | 12/2013 | Macq | |
| 2014/0368615 A1* | 12/2014 | van Baar | G01S 17/894 |
| | | | 382/154 |
| 2015/0063453 A1* | 3/2015 | Kang | H04N 19/70 |
| | | | 375/240.12 |
| 2015/0249842 A1* | 9/2015 | Norkin | H04N 19/30 |
| | | | 375/240.03 |
| 2015/0334365 A1* | 11/2015 | Tsubaki | G06T 15/20 |
| | | | 348/51 |
| 2021/0383590 A1* | 12/2021 | Roimela | H04N 19/597 |
| 2023/0362409 A1* | 11/2023 | Chupeau | G06V 10/762 |
| 2023/0379495 A1* | 11/2023 | Fleureau | H04N 19/597 |
| 2024/0098235 A1* | 3/2024 | Sabater | H04N 13/161 |
| 2024/0185507 A1* | 6/2024 | Sabater | G06T 15/503 |
| 2024/0244259 A1* | 7/2024 | Doyen | G03H 1/08 |
| 2025/0056016 A1* | 2/2025 | Fleureau | H04N 19/46 |

OTHER PUBLICATIONS

D. Mieloch, A. Dziembowski and M. Domański, "Depth Map Refinement for Immersive Video," in IEEE Access, vol. 9, pp. 10778-10788, 2021, doi: 10.1109/ACCESS.2021.3050554.

Nguyen et al "RGBD-Net Prediction Color and Depth Images for Novel Views Synthesis" Computer Vision and Pattern Recognition Nov. 29, 2020.

Liu "Self Guided Novel View Synthesis Via Elastic Displacment Network" 2020 IEEE Winter Conf. on Applications of Computer Vision, Mar. 1, 2020 p. 164-173.

Shade et al "Layered Depth Images" Computer Graphics, Jul. 19-24, 1998, p. 231-242.

Szeliski et al "Stereo Matching With Transparency and Matting" Int. Journal of Computer Vision, 32(1), p. 45-61 (1999).

Zhou et al "Stereo Magnification Learning View Synthesis Using Multiplane Images" ACM Trans. Graph. vol. 37, No. 4 Aug. 2018.

Tucker et al "Single View View Synthesis With Multiplane Images" CVPR 2020.

Salahieh et al "Test Model 6 for MPEG Immersive Video" ISO/IEC JTC 1/SC 29/WG Jul. 11, 2020.

Painters Algorithm "Wikipedia" downloaded Sep. 13, 2023.

\* cited by examiner

LOW COMPLEXITY MULTILAYER IMAGES WITH DEPTH

CROSS-REFERENCE TO PRIOR APPLICATIONS

This application is the U.S. National Phase application under 35 U.S.C. § 371 of International Application No. PCT/EP2022/060859, filed on Apr. 25, 2022, which claims the benefit of EP Patent Application No. EP 21170826.8, filed on Apr. 28, 2021. These applications are hereby incorporated by reference herein.

FIELD OF THE INVENTION

The invention relates to multilayer images. In particular, the invention relates to the generation and rendering of multilayer images.

BACKGROUND OF THE INVENTION

Multiplane images (MPI) are a potential alternative to the multi-view and depth (MVD) format for immersive video. Comparing typical rendering errors of both formats, MVD suffers from noise on object boundaries and MPI tends to blur viewports.

Multiplane images (MPI) are defined by multiple surfaces. Instead of a set of planes, it could also be a set of spheres (onion rings) or any other type of surfaces. Spheres are useful for omnidirectional content, e.g. three degrees of freedom plus (3DoF+). Thus, the term "multiplane images" will be generalized to "multilayer images" for this application.

The MVD type of error is caused by the assumption that a pixel has a single depth value. This is not true at object edges and for semi-transparent objects. Depth coding noise amplifies this problem. To compensate for this, views need to be more closely spaced and this increases bitrate and pixelrate, thus increasing the processing cost to create the bitstream (e.g. more hardware).

The MPI type of error is caused by object surfaces that do not coincide with image planes. To compensate for this, layers need to be more closely spaced and this increases bitrate and pixelrate, thus increasing the processing cost to create the bitstream (e.g. more hardware).

A hybrid approach is to add a depth/displacement map to each layer of an MPI, but this requires a switch to a more computationally expensive rendering algorithm. The simplicity of rendering MPI compared to MVD is one of the main benefits of MPI as it allows for targeting low-complexity devices.

Thus, there is a need for a type of image format which reduces both types of error whilst also reducing the computational power to render them.

SUMMARY OF THE INVENTION

The invention is defined by the claims.

According to examples in accordance with an aspect of the invention, there is provided a method for generating multilayer images, the method comprising:
receiving three-dimensional, 3D, source data of a scene;
generating a plurality of layers at different depths in a virtual 3D scene, wherein each layer corresponds to a particular layer depth value relative to an origin point;
generating image data for each layer based on the 3D source data, wherein the image data comprises texture data and transparency data; and
generating displacement maps for the layers based on the 3D source data and the depth values of the layers, the displacement maps defining the depth of different points on a corresponding layer relative to the layer depth, wherein:
the generation of the displacement maps is restricted such that a depth surface as defined by any displacement map does not intersect any other depth surface in the virtual 3D scene, wherein a depth surface is defined as the mapping of a displacement map onto the corresponding layer.

Multilayer images (without displacement maps) suffer from blurring due to object surfaces not coinciding with the depth value of any layer. More layers can be added but at a computational and/or time cost. Depth can be added to the layers by having a displacement map on the layers which defines the depth (relative to the layer depth value) of each point on the layer.

However, adding additional depth to each layer can cause the layers to intersect which significantly increases the computational resources required to render the multilayer image and is likely to create artefacts in the final image. When rendering a single multilayer image, or when pre-rendering a multilayer video, the time and resources taken for decoding and rendering usually do not matter. However, for broadcasting 3D multilayer video live, it is preferable to have the 3D video in sync with its 2D counterpart.

The invention is based in part on the realization that some rendering algorithms are faster than others. The inventors have observed that the faster rendering algorithms usually assume the layers (when projected to the viewport) do not intersect. This assumption is implicit as these algorithms are typically used to render multilayer images without displacement maps. For example, the so-called painter's algorithm can be used to render multilayer images/videos with displacement maps, as long as the layers do not intersect.

Thus, the invention is based on imposing a restriction on the generation of displacement maps which ensures the layers do not intersect. This enables any user to render the multilayer image/video using a quicker and standardized rendering method, thus enabling the broadcasting of live 3D multilayer video at stable and viewer friendly frame rates.

Mapping the displacement map onto the corresponding layer may include, for example, a translation from the origin to the corresponding layer when the layers are planes. Additionally, the displacement map may need to be stretched if, for example, it has been normalized.

The method may further comprise generating a maximum depth value and a minimum depth value for a depth surface with a corresponding displacement map, wherein the generation of the displacement map is further restricted such that the difference between the maximum depth value of a first depth surface and the minimum depth value of a second, adjacent, depth surface is greater than or equal to a predetermined margin.

Encoding video is useful as it minimizes the amount of data which has to be transmitted. However, subsequent decoding of the data does not guarantee that the decoded data will be exactly the same as the initial (pre-encoded) data. Thus, by having a margin between each layer, the decoded layers are guaranteed to not intersect even after some encoding/decoding errors.

The margin may be, for example, at least 1% of the distance between each layer (without displacement maps).

The exact distance may depend on the encoding/decoding algorithms used and the corresponding error margins for these algorithms.

The method may further comprise determining a plurality of first angles between viewing rays from the origin and a normal vector perpendicular to a depth surface, wherein the generation of a displacement map is further restricted such that the first angles are smaller than or equal to a first pre-determined angle.

When the normal vector of the surface of a layer with additional depth (i.e. a depth surface) makes a large angle with a viewing ray (straight line from the origin), the layer itself stretches when it is rendered which reduces the quality of the rendered multilayer image. This is usually due to the assumption that a pixel (a point on the layer) has a single depth value. Additionally, a surface with a large angle contains a large amount of data in a short space when viewed from the origin.

If a depth surface has a high "depth gradient" (i.e. the depth changes significantly in a short space), the difference in depth between pixels is high. This can be measured by the angle (first angle) between a viewing ray and the normal vector to the surface of the displacement map mapped onto the layer. Thus, the stretching (when rendering) can be limited by restricting the angle (first angle).

The first pre-determined angle may be restricted to a maximum of 70 degrees. Preferably, the first pre-determined angle is at most 60 degrees.

The method may further comprise determining a plurality of second angles between viewing rays from a viewing space and a normal vector perpendicular to a depth surface with a corresponding displacement map, wherein the viewing space defines a space from which the multilayer image can be viewed and wherein the generation of the displacement map is further restricted such that the second angles are smaller than or equal to a second pre-determined angle.

Similarly to the reasoning for restricting the first angle, restricting the "second angle" reduces the stretching effect when rendering the multilayer image. However, in the case of the second angle, a viewing space is considered which defines the space from which the multilayer image can be viewed by a viewer.

In other words, all angles are considered from all points from which the multilayer image can be viewed (not just the origin). By restricting the second angle from any point in the viewing space, the multilayer image does not become stretched (at points with high depth gradient) from any point from which it can be viewed (while satisfying the no-intersection requirement).

The generation of a displacement map may be further restricted such that the curvature at any point on the depth surface defined by the displacement map is smaller than or equal to a pre-determined curvature value.

The curvature of a surface (i.e. the second derivative of the surface) defines the amount by which the surface deviates from being a plane. For 2D curves, an example is that of a circle, which has a curvature equal to the reciprocal of its radius. Smaller circles bend more sharply, and thus have higher curvature.

Thus, for multilayer images, it is advantageous to restrict the curvature of the displacement maps in order to avoid sharp changes in depth. Additionally, surfaces with relatively small curvatures are smoother and thus, usually, easier to render.

The generation of a displacement map may comprise:
generating a rough displacement map based on the 3D source data, wherein the generation of the rough displacement map is not restricted;
encoding the rough displacement map;
decoding the encoded rough displacement map; and
generating a reconstruction filter based on the decoded rough displacement map and a set of restrictions, wherein the displacement map is based on the rough displacement map and the reconstruction filter.

Encoding and decoding data can result in slight variations in the initial (pre-encoded) and final (post-decoding) data. Thus, the restrictions (i.e. non-intersecting layers, margin between layers, angle restrictions and/or curvature restrictions) applied to the generation of a displacement map pre-encoding may not apply to the displacement map after it is decoded.

Thus, it is advantageous to learn how the encoding and decoding will change a rough displacement map (without any restrictions) and then generate a reconstruction filter which, when applied to the decoded rough displacement map, applies the restrictions.

The method may further comprise separating a layer into a plurality of sub-layers based on the image data for the layer, wherein a displacement map is generated for a sub-layer based on the image data corresponding to the sub-layer.

For example, some areas of a layer may be fully transparent and thus the generation of a displacement map on these areas may not be necessary. Thus, the layer can be separated into sub-layers based on the image data (i.e. the texture data and the transparency data) and displacement maps can be generated for sub-layers instead of for the whole layer. Additionally, different restrictions can be applied to the displacement maps for each sub-layer. This gives more room for the encoder to optimize the representation of the content, but it does not increase the decoding or rendering complexity.

The invention also provides a method for rendering multilayer images, the method comprising:
obtaining a plurality of layers, a plurality of displacement maps and image data suitable for the generation of a multilayer image;
obtaining an indication of restrictions, wherein the indication of restrictions comprises information relating to the restrictions with which the displacement maps were generated and wherein the indication of restrictions signals that a depth surface as defined by any displacement map does not intersect any other depth surface in a virtual 3D scene, wherein a depth surface is defined as the mapping of a displacement map onto the corresponding layer;
determining a rendering method based on the indication of restrictions; and
rendering the multilayer image based on the layers, the displacement maps and the image data using the determined rendering method.

Obtaining a displacement map may be based on obtaining a rough displacement map corresponding to a displacement map generated without restrictions, obtaining a reconstruction filter and applying the reconstruction filter to the rough displacement map.

The inventions also provides a computer program product comprising computer program code means which, when executed on a computing device having a processing system, cause the processing system to perform all of the steps of the method for generating and/or rendering the multilayer images.

The invention also provides a system for generating multilayer images, the system comprising a processor configured to:
  receive three dimensional, 3D, source data of a scene;
  generate a plurality of layers at different depths in a virtual 3D scene, wherein each layer corresponds to a particular layer depth value relative to an origin point;
  generate image data for each layer based on the 3D source data, wherein the image data comprises texture data and transparency data; and
  generate displacement maps for the layers based on the 3D source data and the depth values of the layers, the displacement maps defining the depth of different points on a corresponding layer relative to the layer depth, wherein:
  the generation of the displacement maps is restricted such that a depth surface as defined by any displacement map does not intersect any other depth surface in the virtual 3D scene, wherein a depth surface is defined as the mapping of a displacement map onto the corresponding layer.

The processor may be further configured to generate a maximum depth value and a minimum depth value for a depth surface with a corresponding displacement map, wherein the generation of the displacement map is further restricted such that the difference between the maximum depth value of a first depth surface and the minimum depth value of a second, adjacent, depth surface is greater than or equal to a pre-determined margin.

The processor may be further configured to determine a plurality of first angles between viewing rays from the origin and a normal vector perpendicular to a depth surface, wherein the generation of a displacement map is further restricted such that the first angles are smaller than or equal to a first pre-determined angle.

The processor may be further configured to determine a plurality of second angles between viewing rays from a viewing space and a normal vector perpendicular to a depth surface with a corresponding displacement map, wherein the viewing space defines a space from which the multilayer image can be viewed and wherein the generation of the displacement map is further restricted such that the second angles are smaller than or equal to a second pre-determined angle.

The generation of a displacement map may be further restricted such that the curvature at any point on the depth surface defined by the displacement map is smaller than or equal to a pre-determined curvature value.

The processor may be further configured to generate a displacement map by:
  generating a rough displacement map based on the 3D source data, wherein the generation of the rough displacement map is not restricted;
  encoding the rough displacement map;
  decoding the encoded rough displacement map; and
  generating a reconstruction filter based on the decoded rough displacement map and a set of restrictions, wherein the displacement map comprises the rough displacement map and the reconstruction filter.

The processor may be further configured to separate a layer into a plurality of sub-layers based on the image data for the layer, wherein a displacement map is generated for a sub-layer based on the image data corresponding to the sub-layer.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a method for generating multilayer images. The method comprises receiving three-dimensional, 3D, source data of a scene and generating a plurality of layers at different depths in a virtual 3D scene, wherein each layer corresponds to a particular layer depth value relative to an origin point. Image data is generated for each layer based on the 3D source data, wherein the image data comprises texture data and transparency data, and displacement maps are generated for the layers based on the 3D source data and the depth values of the layers. The displacement maps define the depth of different points on a corresponding layer relative to the layer depth, wherein the generation of the displacement maps is restricted such that a depth surface, as defined by any displacement map, does not intersect any other depth surface in the virtual 3D scene. A depth surface is defined as the mapping of a displacement map onto the corresponding layer.

Figure 1A:
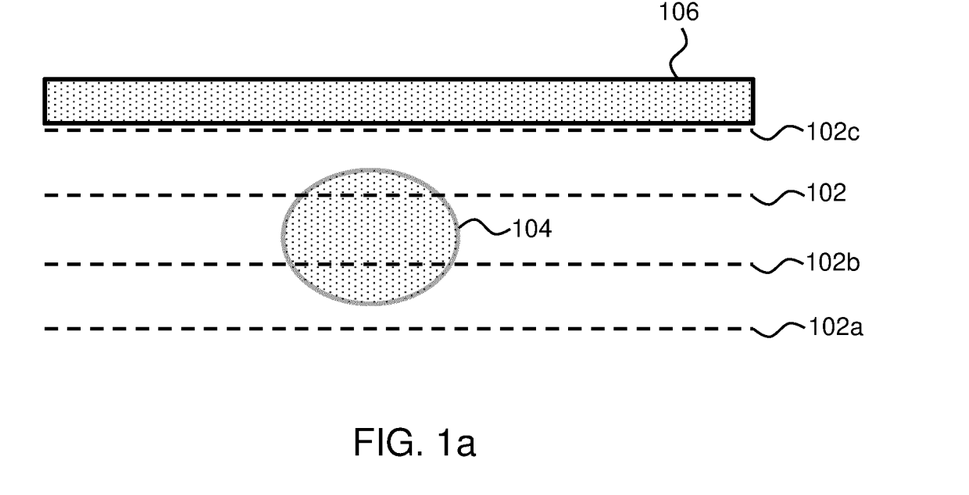
FIG. 1a shows an illustration of the layers in a multilayer image.

FIG. 1a shows an illustration of the layers 102 in a multilayer image. Each layer 102 represents a different depth value within the virtual scene. Texture and transparency values are given to each pixel in each layer 102. In this case, the first layer 102a would correspond to the front of the surface of the object 104 closest to the first layer 102a. Thus, only the pixels corresponding to the front of the object 104 would have a texture and the rest of the pixels would have a transparency value of 100%.

Similarly, the second layer 102b would correspond to the rest of the surface of the front of the object 104 which is closer to the second layer 102b than the first layer 102a. The fourth layer 102c would correspond to the background 106.

However, the layers 102 do not correspond exactly with the object 104 which can cause blur due to the parallax between the layers 102.

In this example, the layers 102 are evenly spaced and are represented by planes. However, the distance between the layers 102 may differ (e.g. relative to the distance from an origin point) and the layers 102 may, for example, be spherical instead of planes.

Figure 1B:
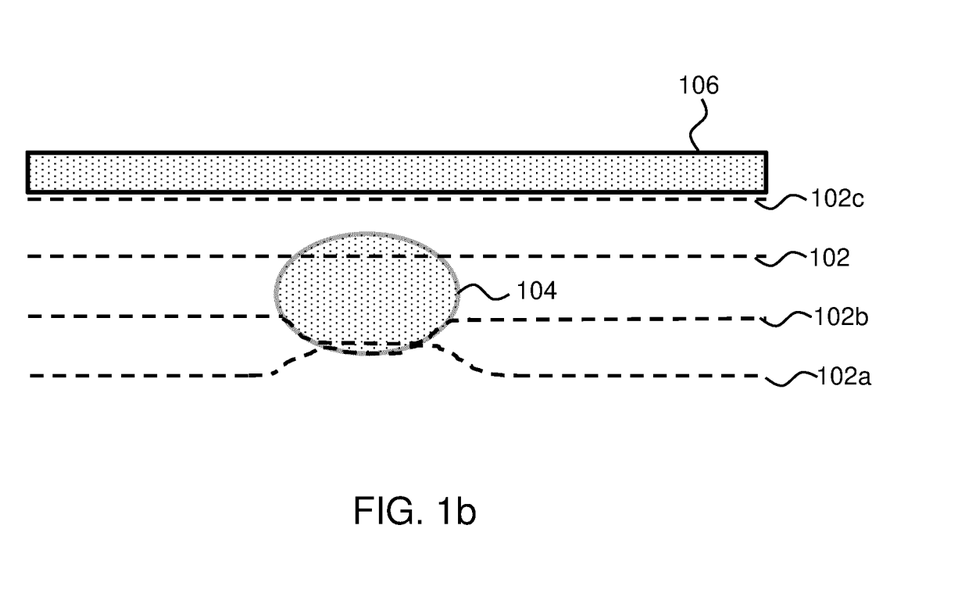
FIG. 1b shows an illustration of the layers in a multilayer image with additional depth.

FIG. 1b shows an illustration of the layers 102 in a multilayer image with additional depth. The additional depth can be defined by a displacement map for each layer 102. In this case, the layers 102 are warped towards the object surface which greatly reduces the blur from the parallax between layers 102. However, multilayer images with additional depth typically require significant computational resources to render (much larger than the resources required for multilayer images without additional depth). It is thus proposed to impose restrictions on the displacement maps, and signal the restrictions in the bitstream.

Figure 2:
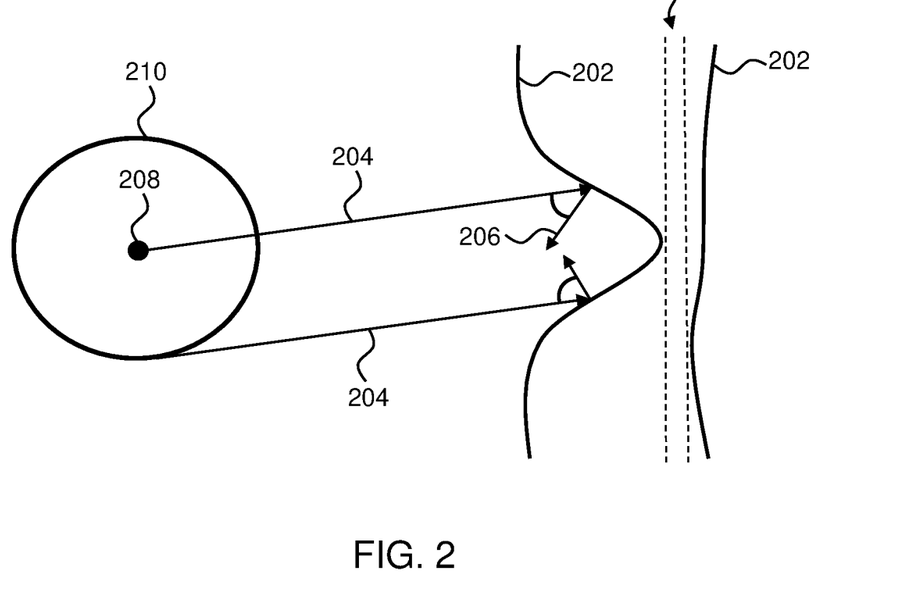
FIG. 2 shows an illustration of the restrictions on depth surfaces.

FIG. 2 shows an illustration of the restrictions on depth surfaces 202. The restrictions are chosen to enable a client to use the simpler rendering algorithms (e.g. inverse painter's algorithm) and further reduce the time and/or computational resources required to render the multilayer images. Having knowledge of the restrictions, the encoder and decoder may make use of them in multiple ways.

The restrictions are defined in terms of a "depth surface" 202. A depth surface 202 is, in essence, a layer 102 in the virtual space with additional depth (i.e. with the displacement map applied to the layer 102). The restrictions are:

Displacement maps are generated such that the depth surfaces 202 do not intersect in the virtual space.

Displacement maps are generated such that the depth surfaces 202 are separated in virtual space by a specified margin 212.

Restricting the angle of any normal vector 206 from a depth surface 202 with a viewing ray 204 from the virtual scene origin 208.

Restricting the angle of any normal vector 206 from a depth surface 202 with any viewing ray 204 through a defined viewing space 210.

Restricting the curvature of the depth surface 202.

The spacing between layers 102 generally scales with their distance (r [m]) from the scene origin 208. That is, they are equally spaced in terms of normalized disparity (1/r [m$^{-1}$]). When layers 102 do not overlap and two layers 102 have a reference distance $r_n < r_{n+1}$, then the boundary $r_{n,far}$ between the two depth surfaces 202 can be set to the geometric or arithmetic mean $\sqrt{r_n r_{n+1}}$ or $\frac{1}{2}(r_n + r_{n+1})$.

Each depth surface 202 could be defined by a narrow box (or onion ring) in the virtual space in order to include the non-intersection restriction in the definition of the displacement maps. The displacement maps can be coded either as a delta-depth value: $r_n + \Delta r_n(u, v) \in (r_{n,min}, r_{n,max})$ or as a normalized disparity $d_n + \Delta d_n(u, v) \in (d_{n,min}, d_{n,max})$. Both choices are acceptable and not significantly different unless the final layer 102 is allowed to be placed very far away or at infinite depth (i.e. zero normalized disparity). In that case it may be required to use normalized disparity.

It is also possible to overlap the depth ranges of consecutive depth surfaces 202 but still restrict that them to not intersect. In that case it could, for instance, be that a minimum distance of a depth surface 202 is restricted to the layer depth value of an adjacent layer 102 (i.e. $r_{n,min} = r_{n-1}$ and $r_{n,max} = r_{n+1}$). In this case, the restriction is not clear from the displacement map definition and needs to be restricted separately. The non-intersection restriction may also need to be signalled separately when transmitted, for example, by adding an indication (i.e. a flag) to the bitstream.

The displacement map may be coded as a luma image and the luma values may be linearly mapped on the delta-depth or delta-normalized disparity range of the layer 102.

When depth surfaces 202 do not intersect, and with the viewing zone not intersecting any of the layers 102, the depth order of the layers 102 is known, and depth surfaces 202 can thus be rendered front to back (inverse Painters algorithm). When depth surfaces 202 do intersect, then much more analysis is needed (e.g. splitting, reordering, etc.) to blend the depth surfaces together.

When a margin 212 between the depth surfaces 202 is signalled, then $r_{n,far} < r_{n+1,near}$. In other words, the difference between the maximum depth value of a depth surface 202 and the minimum depth value of an adjacent depth surface 202 is greater than or equal to a pre-determined margin 212.

The margin could be specified as a ratio whereby "zero" defines a multilayer image with no additional depth and "one" defines a multilayer image with non-overlapping but potentially touching depth surfaces 202. The margin 212 may be the same for all depth surfaces 202 or can be specified for individual layers 102, for instance, by explicitly providing the maximum and minimum depth values ($r_{n,min}$, $r_{n,max}$) for some or all depth surfaces 202.

Encoding and decoding error may cause initially non-intersecting depth surfaces 202 to intersect after the displacement maps have been encoded, transmitted and decoded. Thus, defining a margin 212 between depth surfaces 202 ensures that they won't intersect after being encoding/decoding.

When a normal vector 206 from a depth surface 202 makes a large angle with a viewing ray 204 from the origin 208, the depth surface 202 can stretch during rendering and this can reduce quality. Typically, the rendering algorithm has to compensate for the stretching (e.g. when rendering multi-view+depth images) which requires additional time and/or computational resources. Thus, by restricting the angle, the overall computational resources and processing time required can be kept relatively low and consistent.

If the viewer of the multilayer image is expected to stay at the origin point 208, then it may only be necessary to restrict the viewing rays 204 from the origin 208. However, if the viewer is expected to move around it may be necessary to restrict the viewing rays 204 from any point inside a viewing space 210.

The curvature of the depth surfaces 202 also affects the time/computational resources required to render a multilayer image. Sharp changes in the depth surface 202 (i.e. high curvature) are difficult to render whilst smooth surfaces (i.e. small curvature) tend to be relatively easier to render. If the curvature is restricted to a maximum curvature for one or more of the depth surfaces 202 the time/computational resources required can be further kept low and consistent.

Figure 3:
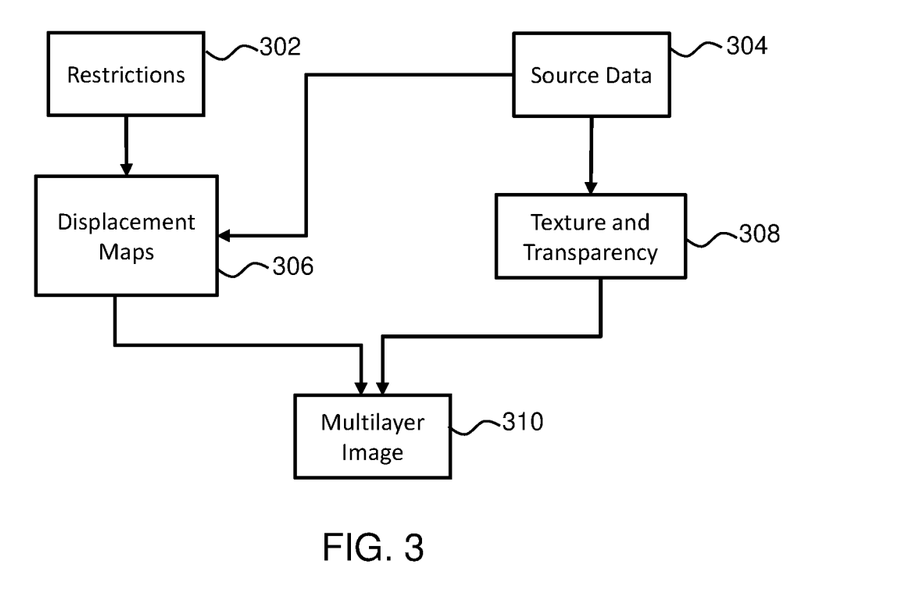
FIG. 3 shows a first example of a method for generating multilayer images with restrictions.

FIG. 3 shows a method for generating multilayer images 310 with restrictions 302. Three-dimensional, 3D, source data 304 of a scene is obtained from, for example a plurality of cameras. A plurality of layers are generated at different depths in a virtual 3D scene such that each layer corresponds to a particular layer depth value relative to an origin point. Image data 308 is generated for each layer based on the 3D source data 304, the image data comprising texture data and transparency data.

Displacement maps 306 are generated for each one of the layers based on the 3D source data 304 and the depth values of the layers, the displacement maps 306 defining the depth of different points on a corresponding layer relative to the layer depth. The generation of the displacement maps 306 also based on the restrictions 302. The restrictions 302 must include at least the non-intersecting restriction explained above.

The displacement maps 306 and the image data 308 can be rendered into multilayer images 310. Alternatively, the displacement maps 306 and the image data 308 can be encoded and transmitted to a client in order to be rendered by the client.

Optionally, the client (i.e. the decoder) has a filter to reconstruct the displacement maps 306 after encoding that is parameterized by the signaled restriction(s) 302. For instance, the decoder may employ a blur filter or morphological filter to remove fast transitions. The strength of the filter depends on the signaled restrictions and may be locally varying in some cases.

Figure 4:
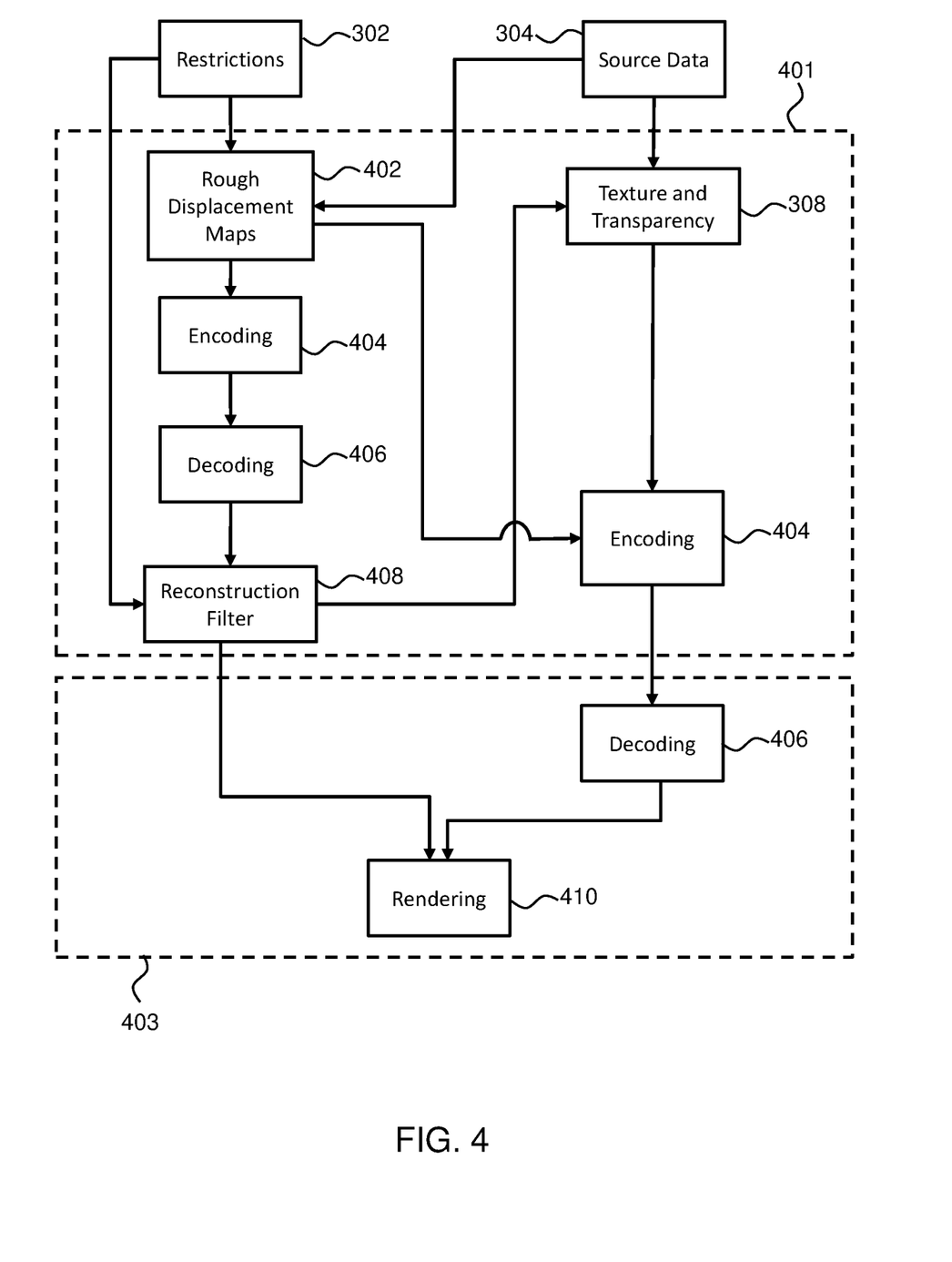
FIG. 4 shows a second example of a method for generating, transmitting and rendering multilayer images with restrictions.

FIG. 4 shows a method for generating, transmitting and rendering multilayer images with restrictions 302. The restrictions 302 must include at least the "non-intersecting layers" restriction. The restrictions 302 may be obtained from a user input or from a pre-determined list of restrictions. The 3D source data 304 may be obtained from one or more cameras and/or additional depth sensors. The restrictions 302 and the 3D source data 304 can be sent to a server 401 in order for them to transmit the necessary data to a client 403 to render a multilayer image.

The 3D source data 304 and the restrictions 302 are used to generate rough displacement maps 402 by the server 401. The rough displacement maps 402 are then encoded 404, decoded 406 and a reconstruction filter 408 is applied. Encoding 404 usually comprises data compression or some type of data reduction in order to reduce the amount of data transmitted. Thus, when encoded data is decoded in step 406, the resulting decoded data is not equal to the original data prior to encoding 408 (e.g. lower quality).

The reconstruction filter 408 filters the decoded displacement maps in accordance with the restrictions 302 to ensure that the final displacement maps have the restrictions applied. The filter may for instance manipulate displacement map values to avoid depth layers to intersect and reduce their depth gradient and curvature. Thus, the combination of the encoding and decoding steps plus reconstruction filter enables the transmission of a displacement map within the restrictions 302, and with a lower bitrate because only a rough displacement map was input into the encoder 404, and the encoder was permitted to apply data reduction techniques.

The 3D source data 304 is also used to generate image data 308 (i.e. transparency and texture/color values) for the layers 102. The rough displacement maps 402 and the image data 408 can thus be encoded 404 and transmitted to a client 403 from, for example, a server 401. The texture and transparency data may be optimized based on the reconstructed displacement maps.

The client 403 can then decode 406 the transmitted data and apply the reconstruction filter 408 to the rough displacement maps 402. The multilayer images can thus be rendered 410 from the filtered displacement maps and the decoded image data.

For example, a server 401 (i.e. the encoder) may make use of a reconstruction filter 408 by transmitting a rough displacement map 402 that is coarse and has fast transitions. It is more efficient for video codecs to encode 404 only the DC value for a coding block using a discrete cosine transform (DCT). For example, when a block has a uniform value, only one coefficient is needed to encode the block. When this is applied, the rough displacement map 402 looks "stepped". This is only possible because the reconstruction filter 408 would filter down the data to reduce the depth gradient and curvature. This can be achieved with a suitable low-pass filter.

This can be more efficient to encode 404 and both encoder and decoder may apply a specified reconstruction filter 408 to reconstruct the displacement map within the signaled restrictions. The encoder at the server 401 can then calculate appropriate values for the transparency and texture/color of each layer 102 based on the filtered displacement maps. In this way, a coding gain is achieved.

Additionally, the client 403 may have a fallback rendering method for rendering 410 outside of an intended viewing space 210 at which the restrictions 302 are no longer guaranteed to be suitable. This may involve scaling to reduce complexity, limiting the number of layers 102 used for rendering, and/or approximating the blending operation.

The layers 102 in multilayer images are typically sparse and only some (rectangular) patches are typically stored for each layer. It is possible to consider each patch as a separate sub-layer with separate parameters. This gives more room for the encoder to optimize the representation of the content without it increasing the decoding or rendering complexity.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

A single processor or other unit may fulfill the functions of several items recited in the claims.

The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

If the term "adapted to" is used in the claims or description, it is noted the term "adapted to" is intended to be equivalent to the term "configured to".

Any reference signs in the claims should not be construed as limiting the scope.

The invention claimed is:

1. A method comprising:
 receiving three-dimensional source data of a scene;
 generating a plurality of layers at different depths in a virtual three-dimensional scene,
  wherein each layer corresponds to a layer depth value;
 generating image data for each layer based on the three-dimensional source data, wherein the image data comprises texture data and transparency data; and generating displacement maps for the plurality of layers based on the three-dimensional source data and the layer depth values,
 wherein the displacement maps define the depth of points on a corresponding layer relative to the layer depth,
 wherein the generation of the displacement maps is restricted such that a depth surface—as defined by any displacement map does not intersect any other depth surface in the virtual three-dimensional, wherein a depth surface—is defined as the mapping of a displacement map onto the corresponding layer;

generating a maximum depth value and a minimum depth value for a depth surface; and generating with a corresponding displacement map, wherein the generation of the displacement map restricted such that the difference between the maximum depth value of a first depth surface and the minimum depth value of an adjacent second depth surface is greater than or equal to a threshold.

2. The method of claim 1, further comprising determining a plurality of first angles, wherein the first angles are defined between viewing rays from the origin and a normal vector perpendicular to a depth surface, wherein the generation of a displacement map is restricted such that the first angles are smaller than or equal to a first threshold angle.

3. The method of claim 1, further comprising determining a plurality of second angles, wherein the second angles are defined between viewing rays from a viewing space and a normal vector perpendicular to a depth surface of a corresponding displacement map, wherein the viewing space defines a space from which the multilayer image can be viewed, wherein the generation of the displacement map is restricted such that the second angles are smaller than or equal to a second threshold angle.

4. The method of any one of claim 1, wherein the generation of a displacement map is restricted such that the curvature at any point on the depth surface defined by the displacement map is smaller than or equal to a curvature value.

5. The method of claim 1, wherein the generation of a displacement map comprises:

generating a rough displacement map based on the three-dimensional source data, wherein the generation of the rough displacement map is not restricted;

encoding the rough displacement map;

decoding the encoded rough displacement map; and generating a reconstruction filter based on the decoded rough displacement map and a plurality of restrictions, wherein the displacement map is based on the rough displacement map and the reconstruction filter.

6. The method of claim 1, further comprising separating a first layer into a plurality of sub-layers based on the image data for the first layer, wherein a displacement map is generated for a sub-layer based on the image data corresponding to the sub-layer.

7. A method comprising:

obtaining a plurality of layers;

obtaining a plurality of displacement maps;

obtaining image data;

obtaining an indication of restrictions, wherein the indication of restrictions comprises information relating to the restrictions with which the displacement maps were generated, wherein the indication of restrictions signals that a depth surface as defined by any displacement map does not intersect any other depth surface in a virtual three-dimensional scene, wherein a depth surface is defined as the mapping of a displacement map onto the corresponding layer;

determining a first rendering method based on the indication of restrictions; and rendering the multilayer image based on the layers, the displacement maps and the image data using the first rendering method;

generating a maximum depth value and a minimum depth value for a depth surface; and generating with a corresponding displacement map, wherein the generation of the displacement map restricted such that the difference between the maximum depth value of a first depth surface and the minimum depth value of an adjacent second depth surface is greater than or equal to a threshold.

8. The method of claim 7, wherein obtaining a displacement map comprises:

obtaining a rough displacement map, wherein the rough displacement is a displacement map generated without restrictions;

obtaining a reconstruction filter; and applying the reconstruction filter to the rough displacement map.

9. A device comprising:

a processor circuit and a memory circuit, wherein the memory is arranged to store instructions for the processor circuit, wherein the processor circuit is arranged to receive three-dimensional source data of a scene;

wherein the processor circuit is arranged to generate a plurality of layers at different depths in a virtual three-dimensional scene, wherein each layer corresponds to a layer depth value;

wherein the processor circuit is arranged to generate image data for each layer based on the three-dimensional source data, wherein the image data comprises texture data and transparency data; and wherein the processor circuit is arranged to generate displacement maps for the plurality of layers based on the three-dimensional source data and the layer depth values, wherein the displacement maps define the depth of points on a corresponding layer relative to the layer depth, wherein the generation of the displacement maps is restricted such that a depth surface as defined by any displacement map does not intersect any other depth surface in the virtual three-dimensional scene, wherein a depth surface is defined as the mapping of a displacement map onto the corresponding layer;

wherein the processor circuit is arranged to generate a maximum depth value and a minimum depth value for a depth surface, wherein the processor circuit is arranged to generate a corresponding displacement map, wherein the generation of the displacement map is restricted such that the difference between the maximum depth value of a first depth surface and the minimum depth value of a second adjacent depth surface is greater than or equal to a threshold.

10. The device of claim 9, wherein the processor circuit is arranged to determine a plurality of first angles, wherein the first angles are defined between viewing rays from the origin and a normal vector perpendicular to a depth surface, wherein the generation of a displacement map is restricted such that the first angles are smaller than or equal to a first threshold angle.

11. The device of claim 9, wherein the processor circuit is arranged to determine a plurality of second angles, wherein the second angles are defined between viewing rays from a viewing space and a normal vector perpendicular to a depth surface with a corresponding displacement map, wherein the viewing space defines a space from which the multilayer image can be viewed, wherein the generation of the displacement map is restricted such that the second angles are smaller than or equal to a second threshold angle.

12. The device of claim 9, wherein the generation of a displacement map is restricted such that the curvature at any point on the depth surface defined by the displacement map is smaller than or equal to a curvature value.

13. The method of claim 9, wherein the generation of a displacement map comprises:
   generating a rough displacement map based on the three-dimensional source data, wherein the generation of the rough displacement map is not restricted;
   encoding the rough displacement map;
   decoding the encoded rough displacement map; and
   generating a reconstruction filter based on the decoded rough displacement map and a plurality of restrictions,
   wherein the displacement map is based on the rough displacement map and the reconstruction filter.

14. The method of claim 9,
   wherein the processor circuit is arranged to separate a first layer into a plurality of sub-layers based on the image data for the first layer,
   wherein a displacement map is generated for a sub-layer based on the image data corresponding to the sub-layer.

15. The method of claim 1, wherein the layer depth value is relative to an origin point.

16. The method of claim 9, wherein the layer depth value is relative to an origin point.

17. A computer program stored on a non-transitory medium, wherein the computer program when executed on a processor performs the method as claimed in claim 7.

18. A computer program stored on a non-transitory medium, wherein the computer program when executed on a processor performs the method as claimed in claim 16.

* * * * *